(12) United States Patent
Bauer et al.

(10) Patent No.: US 9,016,476 B2
(45) Date of Patent: Apr. 28, 2015

(54) HANDLING PORTIONS

(71) Applicant: Weber Maschinenbau GmbH Breidenbach, Breidenbach (DE)

(72) Inventors: Sigfrid Bauer, Gross Teetzleben (DE); Gerd Lischinski, Schonbeck (DE)

(73) Assignee: Weber Maschinenbau GmbH Breidenbach, Breidenbach (DE)

( * ) Notice: Subject to any disclaimer, the term of this patent is extended or adjusted under 35 U.S.C. 154(b) by 7 days.

(21) Appl. No.: 13/921,283

(22) Filed: Jun. 19, 2013

(65) Prior Publication Data
US 2013/0341254 A1 Dec. 26, 2013

(30) Foreign Application Priority Data
Jun. 25, 2012 (DE) .......................... 10 2012 210 703

(51) Int. Cl.
*B03B 9/00* (2006.01)
*B07C 5/00* (2006.01)
*B26D 7/32* (2006.01)
*G01G 15/02* (2006.01)
(Continued)

(52) U.S. Cl.
CPC ... *B07C 5/00* (2013.01); *B26D 7/32* (2013.01); *B65B 25/06* (2013.01); *G01G 15/02* (2013.01); *G01G 17/02* (2013.01); *G01G 19/387* (2013.01); *B26D 7/30* (2013.01); *B26D 2210/02* (2013.01)

(58) Field of Classification Search
CPC .......... B26D 7/32; B65B 57/14; B65B 57/10; B65B 25/06; B65B 35/04; B65B 35/06; B65B 35/50; B65B 35/54
USPC ............. 209/2, 509, 552, 576, 577, 587, 598; 53/443, 447, 54, 494, 531, 540; 198/339.1, 341.06, 418.5
See application file for complete search history.

(56) References Cited

U.S. PATENT DOCUMENTS 4,137,604 A * 2/1979 Sandberg et al. ............ 99/450.1
4,532,751 A * 8/1985 Mally et al. .................... 53/396
(Continued)

FOREIGN PATENT DOCUMENTS

DE 3733945 A1 4/1989
DE 10236241 A1 3/2004
(Continued)

OTHER PUBLICATIONS

Translation of German Search Report dated Dec. 10, 2012 relating to German Application No. 10 2012 210 703.7.

*Primary Examiner* — David H Bollinger
(74) *Attorney, Agent, or Firm* — Gifford, Krass, Sprinkle, Anderson & Citkowski, P.C.

(57) ABSTRACT

The invention relates to a method of handling portions comprising a respective at least one slice, wherein the slices have been produced by slicing food products, wherein the portions are conveyed, in particular line-wise, one after the other in a main conveying stream along a conveying direction, wherein incomplete portions, in particular portions low in weight, are automatically recognized and/or classified, wherein incomplete portions are expelled from the main conveying stream and are supplied to a correction station in a correction stream, wherein incomplete portions are respectively completed by at least one single slice which is removed from a slice store with the aid of an automatic transfer unit and wherein completed portions are automatically channeled back into the main conveying stream.

19 Claims, 2 Drawing Sheets

(51) Int. Cl.
  *G01G 17/02* (2006.01)
  *G01G 19/387* (2006.01)
  *B26D 7/30* (2006.01)
  *B65B 25/06* (2006.01)

(56) References Cited

U.S. PATENT DOCUMENTS 5,165,218 A * 11/1992 Callahan, Jr. ............ 53/447
5,398,479 A * 3/1995 Diete et al. ............ 53/260
6,189,294 B1 * 2/2001 Baur ............ 53/443
6,837,030 B2 * 1/2005 Drebing et al. ............ 53/517
2012/0167730 A1 * 7/2012 Schaub ............ 83/39
2014/0299447 A1 * 10/2014 Bauer ............ 198/418

FOREIGN PATENT DOCUMENTS

DE  102009046893 A1  5/2011
EP  2463204 A2  6/2012

* cited by examiner

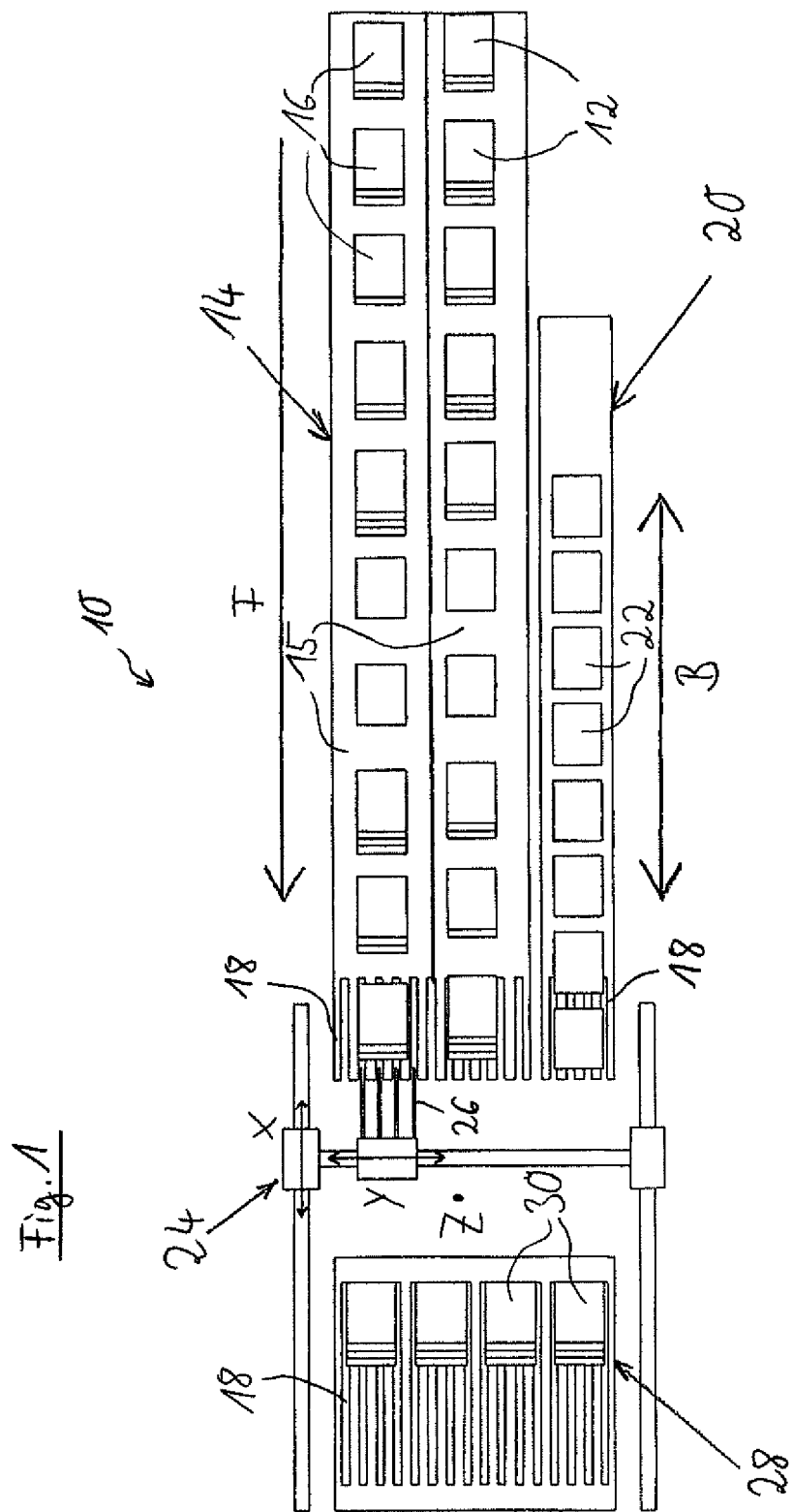

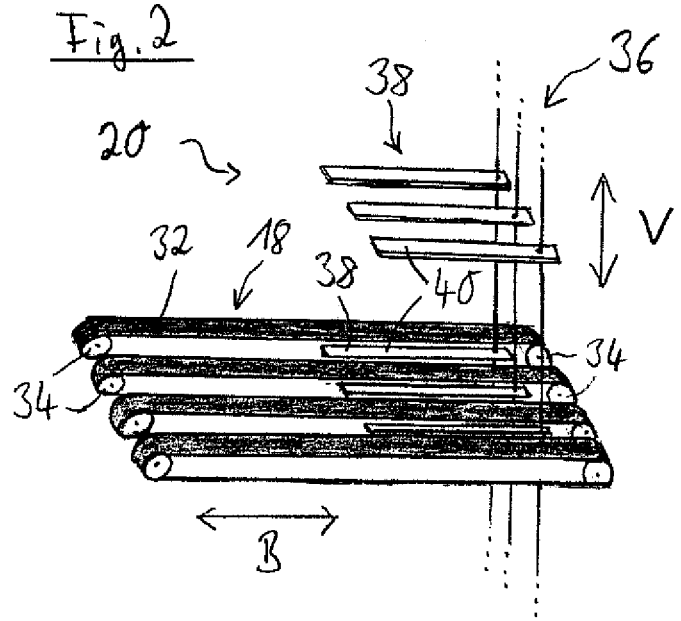
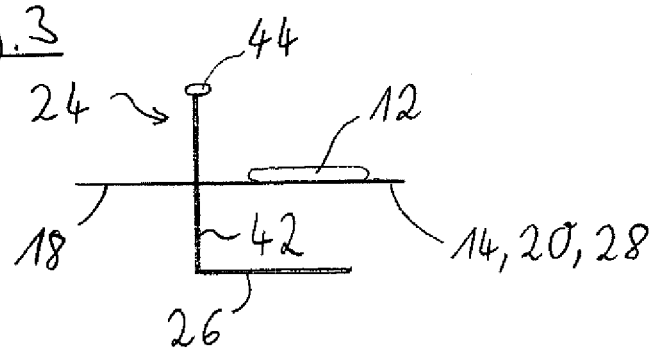

HANDLING PORTIONS

CROSS-REFERENCE TO RELATED APPLICATIONS

This application claims priority of German Patent Application DE 102012210703.7 filed Jun. 25, 2012, the contents of which are incorporated herein by reference.

FIELD OF THE INVENTION

The invention relates to a method and to an apparatus for handling portions respectively comprising at least one slice, wherein the slices are produced by slicing food products. In this process, incomplete portions, in particular portions low in weight, are automatically recognized.

BACKGROUND OF THE INVENTION

Such apparatus are used, for example, in the food industry to supply product slices cut off by a cutting apparatus, such as a high-performance slicer, portion-wise to a downstream processing apparatus, for example to a packaging machine. In particular a belt conveyor or a strap conveyor can be considered as product conveyors. To ensure that only those portions are further processed which satisfy a predefined specification, for example a specific weight or a specific number of slices, incomplete and/or deficient portions are automatically recognized, e.g. with the aid of a sensor, and manually corrected, for example, i.e. are in particular brought up to a demanded desired weight. For this purpose, a corresponding operator, however, requires a certain amount of time so that ultimately the economy of the production plant is restricted by such a correction. Furthermore, on a manual correction, as a consequence of an absence or lack of attention of the operator, it may occur that deficient portions are conveyed on and are finally packaged. Such a further processing of portions of deficient portions is, however, absolutely to be avoided in food production.

SUMMARY OF THE INVENTION

It is therefore an object of the invention to provide a possibility by which incomplete portions can be corrected reliably and automatically.

In accordance with the invention, the portions are conveyed, in particular line-wise, after one another in a main conveying stream along a conveying direction. The conveying of the portions preferably takes place in a plurality of tracks arranged next to one another, for example. In this process, the portions in particular first arise by a simultaneous slicing of food products in different tracks. It is conceivable in this respect that the food products are sliced in multiple tracks by a common slicing machine. Alternatively, a plurality of slicing machines each associated with one track are conceivable.

Incomplete portions, in particular portions low in weight, are recognized and/or classified automatically, e.g. via a sensor, preferably scales. With a multitrack product conveying, multitrack scales can also be used. Specific properties such as the weight, the shape, the slice thickness and/or the fat content of all portions can be recognized, for example. Alternatively or additionally, the portions can, for example, be classified with respect to specific limit values which e.g. relate to the weight, the shape, the slice thickness and/or the fat content.

The determined data can in particular be forwarded to a control. Incomplete portions are expelled from the main conveying stream and supplied to a correction station in a correction stream. The expulsion takes place, for example, by a controllable switch element or rocker element such as known in the technical area.

The correction station can in this respect be configured as a separate component which is e.g. positioned between a slicing machine and a packaging machine. It is, however, also conceivable to integrate the correction station into a slicing machine, into a conveyor unit, into a format set former or into a packaging machine.

Incomplete portions are respectively completed with the aid of an automatic transfer unit by at least one single slice which is taken from a slice store. A plurality of transfer units which are arranged after one another and/or next to one another are also conceivable. The slice store is preferably integrated into the correction station, but can also be provided as a separate station which the transfer unit can access.

The single slice is preferably removed automatically from the slice store, in particular with the aid of the transfer unit. Finally, the completed portions are again automatically channeled back into the main conveying stream. The channeling takes place e.g. by a controllable switch element or rocker element.

Incomplete portions are thus automatically recognized and/or classified in accordance with the invention and are expelled from the main conveying stream. The performance capability or capacity of the slicing apparatus for the food products in this manner does not have to be adapted to the performance capability or capacity of the transfer unit(s). Modern high-speed slicers have such high cutting performances that a transfer unit provided for completing the products would have to be equipped with kinematics which allow very fast movement routines. Even if such kinematics can be technically realized, a corresponding transfer unit frequently does not have the carrying capability required by practice, i.e. from a specific portion weight onward the portions can no longer be moved at the actually desired sped.

Since mostly only comparatively few portions leave the slicing machine in an incomplete manner in practice, the transfer unit has sufficient time to complete the incomplete portions in the correction stream. Portions complete from the start can be moved onward and processed in the main conveying stream in an uninfluenced manner, in particular past the correction station or beneath the correction station or above the correction station. The main conveying stream can in this respect also be conducted through the correction station.

No errors by an operator occur either due to the automatic completion. In addition, costs can be saved.

The automatic completion takes place precisely since single slices—optionally a plurality of single slices after one another—are used for completing respective incomplete portions for the completion.

Since the incomplete portions are first completed by the automatic transfer unit before they are again channeled into the main conveying stream, the correction stream is interrupted. Due to the interruption of the correction stream, the incomplete portions are not transported away from the correction station again unless they have previously been completed and actively brought back into the main conveying stream.

The invention also relates to an apparatus, in particular for carrying out a method in accordance with the invention. The apparatus comprises a main conveyor which conveys the portions after one another, in particular line-wise, in a main conveying stream along a conveying direction. The conveying can, for example, take place in multitracks in tracks arranged next to one another and/or above one another. The food products are sliced, simultaneously, for example, for this purpose, in particular with the aid of a common slicing machine. The apparatus additionally comprises a correction station to which incomplete portions expelled from the main conveying stream can be supplied in a correction stream. In addition, the apparatus comprises a slice store which is configured to store single slices such that the single slices can be removed individually, in particular automatically. A transfer unit in particular works in a correction plane. The transfer unit is configured to complete incomplete portions in each case by means of at least one single slice from the slice store. The transfer unit can in particular be configured to remove the single slices from the slice store individually.

Further developments of the invention are set forth in the dependent claims, in the description and in the enclosed drawings.

In accordance with an embodiment, the completion of the portions and the removal of single slices take place in tracks disposed next to one another with respect to the conveying direction. The movement paths of the transfer unit are thereby minimized. Alternatively, however, it is also conceivable to arrange at least two of the tracks above one another.

In accordance with a further embodiment, single slices are branched off from the main conveying stream to fill the slice store and are supplied to the slice store with the aid of the transfer unit. The filling in particular takes place in that one single slice after the other is picked up by the transfer unit and supplied to the slice store. In this manner, the single slices can in particular also again be removed individually from the slice store. It is alternatively also conceivable that, for example, two or more single slices disposed above one another are always branched off from the main conveying stream and are supplied together to the slice store with the aid of the transfer unit.

In accordance with a further embodiment, at least one conveying device of the slice store is moved against the conveying direction. The slice store, which is in particular configured as a belt conveyor, can thus gradually be filled with single slices. If required, the belt conveyor can again be moved in the conveying direction to make single slices available to the transfer unit for completing incomplete portions.

In accordance with a further embodiment, single slices can be requested on the reaching of a specific minimum filling level of the slice store. If too few single slices are located in the slice store, single slices can be produced directly e.g. with the aid of a control by the slicing apparatus or single slices can be directly expelled from the main conveying stream. The filling level of the slice store can in this respect be determined with the aid of a sensor, for example. This sensor can e.g. be integrated into a belt conveyor of the slice store. It can be ensured in this manner that sufficient single slices to complete incomplete portions are always available.

In accordance with a further embodiment, the slice store is filled by means of the transfer unit. The single slices are in particular in this respect removed from the correction stream individually and supplied to the slice store by the transfer unit. Alternatively or additionally, the single slices are removed from the slice store by means of the transfer unit for completing incomplete portions. In this manner, both the filling and the emptying of the slice store can take place fully automatically. It is, however, alternatively also conceivable that the slice store is filled manually, for example, that is in particular only the removal of the single slices takes place automatically.

In accordance with a further embodiment, the single slices are classified by means of a sensor, in particular by means of an optical sensor. The classification in particular takes place by the size, the shape and/or the weight of the single slices.

In accordance with a further embodiment, the single slices are supplied to the slice store in accordance with their classification.

In this respect, the single slices are preferably supplied to different zones of the slice store in accordance with their classification. The single slices are thus present in the slice store sorted, for example, by size, shape and/or weight. Depending on the property and/or classification of the incomplete portion, a suitable single slice for completing the portion can thus be directly removed from the slice store.

The slice store can, for example, be one or more belt conveyors disposed next to one another. It is alternatively or additionally also conceivable to form the slice store as at least one vertical store. The single slices are accordingly supplied to zones of a vertical store disposed above one another. The individual zones can each be configured as belt conveyors. The vertical store is moved in the vertical direction for supplying and removing single slices until a respectively required single slice can be supplied and/or removed, in particular by means of the transfer unit. A plurality of vertical stores are preferably arranged next to one another and/or behind one another. Single slices which correspond to a specific classification can thereby in particular be directly stored or removed.

In accordance with a further embodiment, single slices are supplied to the slice store which at least on average have a smaller surface and/or a smaller weight than the slices of the incomplete portions. The fact is thereby taken into account that incomplete portions usually only differ slightly from the norm. Unwanted "give-aways" are thereby minimized. The surface and/or the weight of the single slices can be selected in accordance with the deficient weight history of the portions.

In accordance with a further embodiment, the transfer unit is moved in three dimensions. The transfer unit can thus both access all tracks of the correction stream and can raise and lower single slices or portions. The transfer unit can furthermore be moved in and against the conveying direction. Possible interruptions of the tracks in the correction stream can thus be bridged by the transfer unit. It is also conceivable that the transfer unit channels complete portions directly back into the main conveying stream.

In accordance with a further embodiment, the transfer unit first picks up an incomplete portion at a correction track. Subsequently, the transfer unit is moved to the slice store and there picks up at least one single slice in addition to the incomplete portion. An incomplete portion is thus completed by a single slice. If a single slice is not yet sufficient for the completion, any desired further single slices can be brought onto or beneath the incomplete portion one after the other. In this respect, the transfer unit can comprise a sensor, for example scales, to determine how many single slices are required for the completion or whether the portion on the transfer unit is already complete or is still incomplete.

Alternatively, the transfer unit first picks up a single slice from the slice store. So many single slices as are required for completing a specific incomplete portion are picked up after one another on the basis of the classification of the incomplete portions. Subsequently, the transfer unit is moved to a correction track. An incomplete portion is therefore picked up in addition to the at least one single slice. A complete portion also arises overall in this manner.

In accordance with a further embodiment, the transfer unit is moved synchronously with a conveying device of the slice store and/or of the correction station, in particular in the conveying direction, for picking up a single slice from the slice store and/or of an incomplete portion. In this manner, a single slice or an incomplete portion is transferred from the conveying device onto the transfer unit without disturbance.

In accordance with a further embodiment, incomplete portions are branched off from the main conveying stream by means of at least one conveying section and completed portions are supplied with the aid of the transfer unit to at least one second conveying section by means of which the completed portions are again supplied to the main conveying stream. The branching off from or the channeling into the main conveying stream takes place with the help of a rocker belt, for example. The correction track is thus interrupted. The transfer unit is consequently used to bridge a gap in the correction track. It is thus prevented that incomplete portions unintentionally arrive back on the main conveying stream. It is alternatively also conceivable that after the completion of the portions the transfer unit supplies the completed portions directly to the main conveying stream. A second conveying section does not need to be provided in this case.

In accordance with a further embodiment, the single slices are produced by means of a slicing apparatus, in particular a high-performance slicer, which also produces the portions, with in particular the portions being produced in a normal mode of operation and the single slices being produced with an idle normal mode of operation in a single slice operation or the slicing apparatus working in multitracks and at least one track being provided for the production of the single slices. It is thus conceivable that, for example, at the start of the slicing procedure, first only single slices are produced which are expelled from the main conveying stream into the correction stream and are supplied to the slice store. Subsequently, the slicing apparatus changes into a normal mode of operation, for example. It is in particular maintained for so long unit a minimum filling level of the slice store is fallen below. Once a minimum filling level has been reached, single slices are again produced.

In accordance with a further embodiment, the portions are supplied to the correction station line-wise in a multitrack operation, with each portion line containing at least one incomplete portion. It is conceivable in this respect first to expel a complete line, i.e. all portions which are located on different tracks of the main conveying stream, but which are located on the same position with respect to the conveying direction. It is alternatively also conceivable only to expel portions of individual tracks of the main conveying stream, i.e. only to carry out the expulsion for a partial quantity of all tracks.

If a line of the first conveying section contains a complete portion, it is conveyed—without being corrected—by the transfer unit from the first conveying section to the second conveying section or directly onto a track of the main conveying stream. The incomplete portions of the individual lines can, in contrast, be completed, for example by the transfer unit, one after the other. It is conceivable in this respect to complete the incomplete portions e.g. line by line or track by track. It is also conceivable to complete incomplete portions from tracks on which more incomplete portions are located than on the other tracks.

In accordance with a further embodiment, the number of tracks in the correction stream differs from the nominal number of tracks in the main conveying stream. In this respect, the transfer unit orders the incoming portions in outgoing portion lines according to the nominal number of tracks.

The transfer unit can therefore also work as a format set former. A desired format set, i.e. a specific arrangement of complete portions, which are e.g. intended to be supplied to a packaging machine, can thus be achieved by a specific positioning of the completed portions. Portions which are supplied to the transfer unit in e.g. K tracks can be transferred such that they leave the correction station in H tracks. The number of tracks is preferably matched to the number H of tracks in the main conveying stream with the aid of the transfer unit. Completed portions, which are arranged, for example, next to one another in H tracks, can thus be channeled together into a gap of the main conveying track.

In accordance with an embodiment of the apparatus in accordance with the invention, it comprises at least one sensor for the automatic recognition and/or classification of incomplete portions. The sensor can, for example, be an optical sensor such as a product scanner. Scales are also alternatively or additionally conceivable. Multitrack scales can also be used, for example, in multitrack operation. The data determined by the sensor are in particular forwarded to a control. Incomplete portions, in particular portions low in weight, are reliably recognized and/or classified in this manner.

In accordance with a further embodiment, the slice store is arranged next to at least one correction track of the correction station viewed in the conveying direction. In this manner, the transfer unit can access a correction track or the slice store with a travel path which is as small as possible. It is alternatively also conceivable to arrange at least a part of the slice store, e.g. a belt conveyor, above or beneath the correction track.

In accordance with a further embodiment, the slice store comprises at least one conveying device which is movable both in and against the conveying direction, with the slice store preferably having exactly one track. On the movement against the conveying direction, the slice store can be filled, for example. If it is necessary to make use of the single slices from the slice store, it is moved in the conveying direction. The single slices are in this respect, for example, transported onto the transfer unit or are transported into a zone which is accessible to the transfer unit. Alternatively, the slice store can also have a plurality of tracks which are arranged next to one another and/or above one another, for example. The individual tracks can be configured as belt conveyors, for example.

In accordance with a further embodiment, the slice store comprises a vertical store having a plurality of zones which are disposed above one another, with the vertical store being movable perpendicular to a correction plane for supplying and removing single slices. In such a vertical store, which is formed, for example, from a plurality of belt conveyors and/or compartments arranged above one another and/or next to one another, singe slices can, for example, be placed down in a specific zone in accordance with their classification. The slice store can in this respect have an upstream belt conveyor in addition to the vertical store. The vertical store is moved vertically for supplying and removing single slices until a desired zone lies in the plane of the belt conveyor of the slice store so that single slices which are located in the specific zone can be moved into or out of the vertical store with the aid of the belt conveyor of the slice store.

A plurality of vertical stores are preferably arranged next to one another and/or behind one another. Space can be saved by the use of vertical stores. In addition, it is possible to place down or remove single slices directly in accordance with a specific classification.

In accordance with a further embodiment, at least one first conveying section is arranged upstream of the correction station viewed in the conveying direction and at least one second conveying section is arranged downstream. Incomplete portions can be branched off from the main conveyor by means of the first conveying section and completed portions can be supplied to the second conveying section with the aid of the transfer unit. The completed portions can again be supplied to the main conveyor by means of the second conveying section, with the first conveying section and the second conveying section preferably each being configured as a rocker or as an inserter, preferably in the form of a continuous belt. Alternatively, a second conveying section can also be fully dispensed with. In this respect, the completed portions are directly supplied to the main conveyor with the aid of the transfer unit. In this manner, an automatic expulsion and completion of incomplete portions is ensured. The completed portions are also again automatically supplied to the main conveyor.

In accordance with a further embodiment, the transfer unit comprises a picker robot. It can be operated electrically and/or pneumatically, for example.

In accordance with a further embodiment, the picker robot can be moved along two axes extending perpendicular to one another in a correction plane as well as along an axis extending perpendicular to the correction plane. The picker robot can thus be moved, for example, such that it can pick up single slices, incomplete portions and/or complete portions, can move between individual tracks and can additionally, for example, be moved between a first conveying section and a second conveying section. The picker robot has at least one servo axle, for example, for movements in the conveying plane and/or at least one pneumatic or hydraulic axle for the movement in the vertical direction.

In accordance with a further embodiment, the picker robot comprises at least one pick-up fork which can pass through grid structures of the correction station for picking and/or placing single slices and/or portions. In particular the end section so the tracks of the first conveying section, an end section of a belt conveyor of the slice store, the individual zones of the vertical store and/or the tracks of the second conveying section can have grid structures through which the pick-up fork can engage. The pick-up fork can thus, for example, coming from below, pick up a single slice, an incomplete portion or a complete portion or, coming from above, can put on a single slice, an incomplete portion or a complete portion.

In accordance with a further embodiment, the grid structures are each formed by a strap conveyor or by a stationary placing grid, with in particular the strap conveyor comprising a plurality of continuous straps extending in the conveying direction and spaced apart from one another transverse to the conveying direction. The grid structures can thus in particular be passed through by the picker robot and can moreover be moved in or against the conveying direction.

BRIEF DESCRIPTION OF THE DRAWINGS

The invention will be described in the following by way of example with reference to the drawings.

FIG. 1 shows a plan view of an embodiment of an apparatus in accordance with the invention;

FIG. 2 shows a side view of a vertical store of an apparatus in accordance with the invention; and FIG. 3 shows a side view of a pick-up fork of an apparatus in accordance with the invention.

DETAILED DESCRIPTION OF THE PREFERRED EMBODIMENTS

FIG. 1 shows a correction station 10 of an apparatus in accordance with the invention for handling portions 12 which have been produced by slicing food products, for example with the aid of a high-performance slicer, not shown.

The correction station 10 comprises a first conveying section 14 having two correction tracks 15 which are in particular individually controllable and on which incomplete portions 16 are located. The first conveying section 14 can be moved along a conveying direction F. The first conveying section 14 is in particular configured as a continuous conveyor belt 14. The continuous conveyor belt 14 has a grid structure 18 at an end region. The grid structure 18 is formed by a strap conveyor (not shown), wherein the strap conveyor comprises a plurality of continuous straps which extend in the conveying direction, which are spaced apart transverse to the conveying direction and which are conducted by rollers.

The correction station 10 additionally comprises a slice store 20 on which single slices 22 are located. It is configured as a continuous belt conveyor 20 which can be moved in the conveying direction B, i.e. in and against the conveying direction F. The slice store 20 has a grid structure 18 at an end zone.

The correction station 10 furthermore comprises a transfer unit 24 which is configured as a picker robot 24. This transfer unit 24 is movable into the movement directions X, Y and Z (into the plane of the drawing). The movement takes place by electrical or pneumatic drives (not shown). The picker robot 24 has a pick-up fork 26 which is configured such that it can engage through the grid structure 18.

The correction station 10 additionally has a second conveying section 28 which is configured as a continuous conveyor belt 28 having a grid structure 18. Complete portions 30 are shown on the second conveying section 28.

Portions 12 of a food product are first cut off by a slicing machine, not shown. These portions 12 move over a main conveyor, in particular over a plurality of continuous conveyor belts disposed next to one another, to a sensor, not shown. This sensor is configured, for example, as multitrack scales and is suitable to classify the portions 12 and in particular to recognize incomplete portions, i.e. portions 16 low in weight. Incomplete portions 16 are expelled, for example via a rocker, not shown, from the main conveyor and supplied to the correction station 10. In this respect, either only the incomplete portion 16 is directly expelled on an individual track basis or a total line, i.e. simultaneously prepared portions 12 which are disposed next to one another on a common conveyor belt or on mutually separate conveyor belts of the main conveyor and which contain an incomplete portion 16. Lines which do not contain any incomplete portions 17 are, in contrast, not expelled and move onward along the conveying direction F on the main conveyor. The main conveyor is located beneath the correction station 10, for example, or is conducted through the correction station 10 beneath a correction plane (not shown).

The expelled portions 12 are, in contrast, brought line-wise up to an end region of the first conveying section 14. In this case, no individually controllable correction tracks 15 are provided. A common continuous belt conveyor 14 is sufficient in this respect. If, however, a plurality of individually controllable correction tracks 15 are used, the incomplete portions can also be individually brought to an end region of the first conveying section 14.

Once the expelled portions 12 reach an end region of the first conveying section 14, the continuous conveyor belt 14 is stopped. The picker robot 24 is now controlled such that it transfers any complete portions 30 present from the first conveying section 14 to the second conveying section 28. Incomplete portions are, in contrast, first corrected. In this respect, an incomplete portion 16 which is located on the grid structure 18 of a correction track 15 is first picked up from below by the transfer unit 24. The incomplete portion 16 is now located on the pick-up fork 26 of the picker robot 24. The latter is subsequently moved to the slice store 20. Since an incomplete portion 16 is already lying on the pick-up fork 26, it is not possible to pass through the grid structure 18 of the slice store 20 from below and to pick up a single slice 22 in this manner. The picker robot 24 is therefore in particular positioned beneath the slice store 20. The slicer store 20 now moves synchronously with the picker robot 24 along the conveying direction F so that a single slice 22 is applied from above onto the incomplete portion 16. In this manner, any desired further single slices can be picked up until the incomplete portion 16 forms a completed portion 30.

Alternatively, it is also conceivable that the picker robot 24 first picks up a certain number of single slices 22 and subsequently picks up an incomplete portion 16 from a correction track 15. In this case, the first conveying section 14 is also moved synchronously with the picker robot 24 along the conveying direction F.

Once an incomplete portion 16 has been completed, the picker robot 24 is moved in the X direction until it is located above the second conveying section 28. It is now lowered in the Z direction. In this process, the pick-up fork 26 engages through the grid structure 18 of the second conveying section 28, while the completed portion 30 is placed on the second conveying section 20.

Subsequently, the picker robot 24 is again moved to the first conveying section 14 to complete further incomplete portions 16.

In this embodiment, the transfer unit 24 is additionally configured as a format set former. The portions 12 which are supplied to the transfer unit 24 in two correction tracks 15 of the first conveying section 14 are finally placed in four rows in the second conveying section 28.

The complete portions 30 are finally again channeled into the main conveyor, in particular line-wise, for example with the aid of a rocker and/or of an inserter.

To fill the slice store 20 with single slices 22, only single slices 22 are cut off with the aid of the slicing machine at the start of the slicing procedure. They move via the main conveyor into the correction station 10. The picker robot 24 now picks up a single slice 22 from the first conveying section 14 and conveys it up to the slice store 20. The slice store 20 is moved against the conveying direction F, in particular by at least one slice length. This is repeated for so long until a desired minimum filling level of single slices 22 is reached in the slice store 20.

If the filling level in the slice store 20 becomes too low during the completion of the portions, which can be determined with the aid of a sensor, for example, single slices 22 can be directly requested from the slicing machine. The slice store 20 can be filled again with these single slices 22.

An alternative embodiment of a slice store 20 is shown in FIG. 2 which can be used in a correction station 10 in accordance with FIG. 1 instead of the slice store 20 shown there. The slice store 20 in this respect comprises a vertical store 36 as well as a grid structure 18 which is formed by endless straps 32 which are arranged at rollers 34. The continuous straps 32 can be moved along the conveying direction B.

The vertical store 36 comprises compartments 38 which are arranged in different zones 38 of the vertical store 36. These compartments 38 are formed from tines 40 which can be moved through gaps in the grid structure 18. For this purpose, the vertical store 36 can be moved along the adjustment direction V. It is possible in this manner to store single slices 22 above one another. The single slices 22 can in particular be associated by their weight, for example, with a specific compartment 38.

A plurality of vertical stores 36 are preferably arranged behind one another and are filled in each case with single slices 22 of a specific property, e.g. of a specific weight. If now a single slice 22 having a specific weight is required for completing an incomplete portion 16, the corresponding vertical store 36 is moved along the adjustment direction V until the corresponding single slice 22 is placed on the grid structure 18.

A side view of a picker robot 24 is shown in FIG. 3. The pick-up fork 26 in this respect comprises a plurality of L-shaped tines 42 which can engage through the grid structure 18 of the first conveying section 14, of the slice store 20 and/or of the second conveying section 28. This is realized in that the individual tines 42, here L-shaped tines, are only connected to one another sufficiently far above by a transverse connection 44. The L-shaped tines 42 can thus engage through the grid structure 18 and can pick up a portion 12 from below, for example and can place a portion 12 from above on the grid structure 18.

Incomplete portions are reliably and automatically completed by the apparatus in accordance with the invention.

The invention claimed is:

1. A method of handling portions (12) respectively comprising at least one single slice (22), wherein the single slices (22) have been produced by slicing food products, wherein
the portions (12) are conveyed after one another in a main conveying stream along a conveying direction (F);
incomplete portions (16) are automatically recognized and/or classified;
incomplete portions (16) are expelled from the main conveying stream and are supplied to a correction station (10) in a correction stream;
incomplete portions (16) are respectively completed with the aid of an automatic transfer unit (24) by at least one single slice (22) which is taken from a slice store (20); and
completed portions (30) are automatically channeled back into the main conveying stream.

2. The method in accordance with claim 1, wherein the completion of the portions (16) and the removal of single slices (22) take place in tracks disposed next to one another with respect to the conveying direction (F).

3. The method in accordance with claim 1, wherein single slices (22) are branched off from the main conveyor stream and are supplied to the slice store (20) with the aid of the transfer unit (24) to fill the slice store (20).

4. The method in accordance with claim 1, wherein at least one conveying device of the slice store (20) is moved against the conveying direction (F) on the filling of the slice store (20).

5. The method in accordance with claim 1, wherein single slices (22) are demanded once a specific minimum filling level of the slice store (20) has been reached.

6. The method in accordance with claim 1, wherein the slice store (20) is filled by means of the transfer unit (24); and/or wherein the single slices (22) are removed from the slice store (20) by means of the transfer unit (24).

7. The method in accordance with claim 1, wherein the single slices (22) are classified by means of a sensor.

8. The method in accordance with claim 7, wherein the single slices (22) are supplied to the slice store (20) in accordance with their classification.

9. The method in accordance with claim 8, wherein the single slices (22) are supplied to different zones (38) of the slice store (20) in accordance with their classification.

10. The method in accordance with claim 1, wherein the single slices (22) are supplied to zones (38) of a vertical store (36) disposed above one another, said vertical store being moved in the vertical direction (V) for supplying and removing single slices (22) until a respectively required single slice (22) can be supplied and/or removed, and/or wherein the respectively required single slice (22) can be supplied and/or removed by means of the transfer unit (24).

11. The method in accordance with claim 1, wherein single slices (22) are supplied to the slice store (20) and have, at least on average, a smaller surface and/or a smaller weight than the slices of the incomplete portions.

12. The method in accordance with claim 1, wherein the transfer unit (24) is moved in three dimensions (X, Y, Z).

13. The method in accordance with claim 1, wherein the transfer unit (24) first picks up an incomplete portion (16) at a correction track (15), is subsequently moved to the slice store (20) and there picks up at least one single slice (22) in addition to the incomplete portion (16).

14. The method in accordance with claim 1, wherein the transfer unit (24) first picks up at least one single slice (22) from the slice store (20), is subsequently moved to a correction track (15) and there picks up an incomplete portion (16) in addition to the single slice (22).

15. The method in accordance with claim 1, wherein the transfer unit (24) is moved synchronously with a conveying device of the slice store (20) and/or of the correction station (10) for picking up a single slice (22) from the slice store (20) and/or an incomplete portion (16).

16. The method in accordance with claim 1, wherein incomplete portions (16) are branched off from the main conveying stream by means of at least one first conveying section (14) and completed portions (30) are supplied with the aid of the transfer unit (24) to at least one second conveying section (28) by means of which the completed portions (30) are again supplied to the main conveying stream.

17. The method in accordance with claim 1, wherein the single slices (22) are produced by means of a slicing apparatus which also produces the portions (12), and/or wherein the portions (12) are produced in a normal mode of operation and the single slices (22) are produced with an idle normal mode of operation in a single slice operation or with the slicing apparatus working in multitracks and at least one track being provided for the production of the single slices (22).

18. The method in accordance with claim 1, wherein the portions (12) are supplied line-wise in a multitrack operation of the correction station (10), with each portion line containing at least one incomplete portion (16).

19. The method in accordance with claim 1, wherein the number of tracks (15) in the correction stream differs from the nominal number of tracks in the main conveying stream and the transfer unit (24) arranges the incoming portions (16) in the outgoing portion lines in accordance with the nominal number of tracks.

\* \* \* \* \*